Oct. 9, 1928.
P. JACKSON
1,686,562
PROCESS OF FORMING PIPE CLOSURES
Filed June 20, 1927
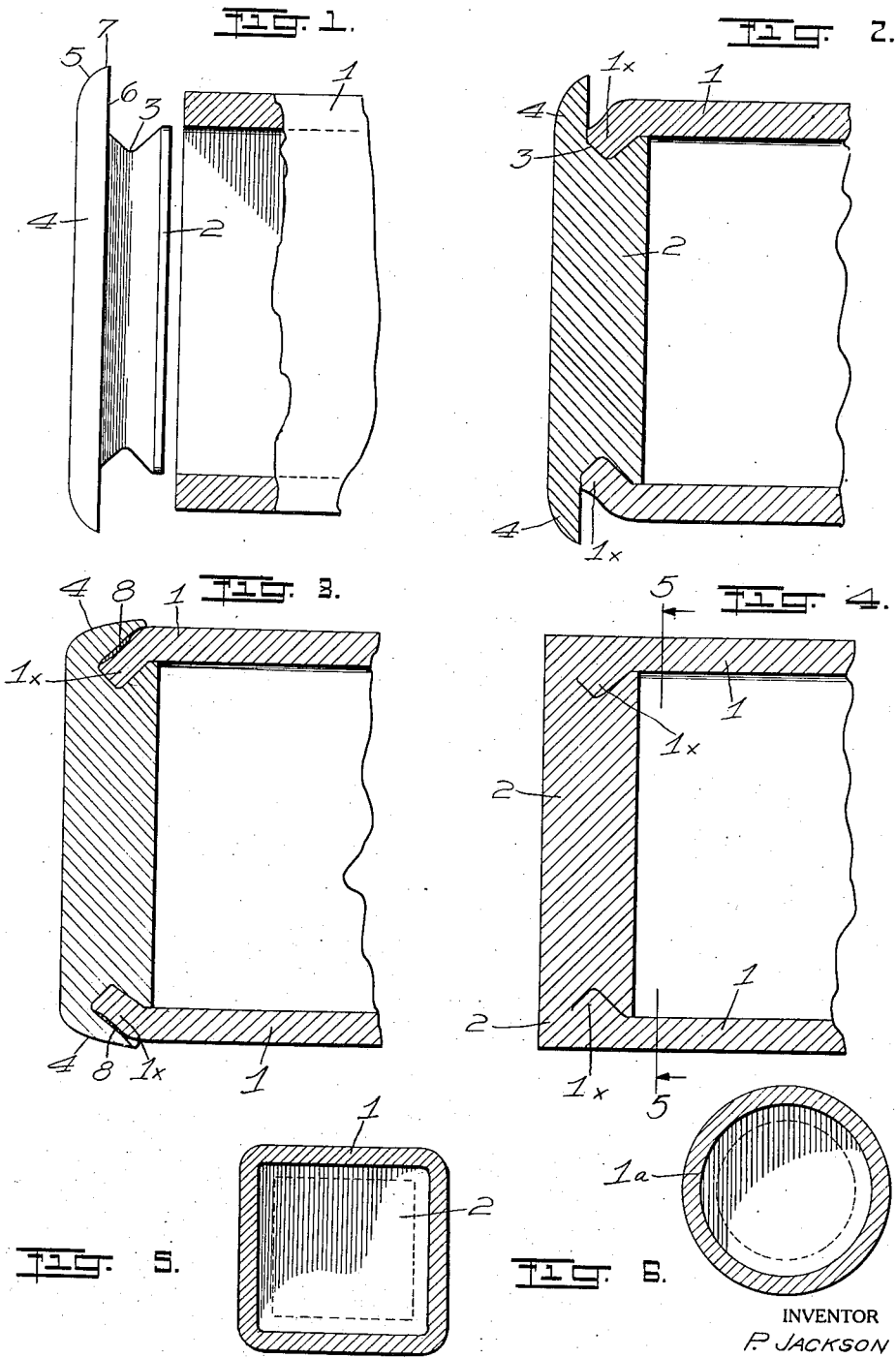
INVENTOR
P. JACKSON
BY
ATTORNEYS Patented Oct. 9, 1928.

1,686,562

UNITED STATES PATENT OFFICE.

PERCY JACKSON, OF CHICAGO, ILLINOIS.

PROCESS OF FORMING PIPE CLOSURES.

Application filed June 20, 1927. Serial No. 200,187.

My invention relates to improvements in process and means for forming pipe closures, and is especially applicable to pipes which are used in connection with high pressure steam boilers.

The existing laws now in force in many of the States and cities of the United States do not permit the use of autogenous or electric fusion welding in the construction of the pipes of high pressure steam boilers, owing to the fact that such welds are liable to give way under the very high pressure used in modern high pressure steam boilers.

An object of the present invention is to provide a pipe closure means which will withstand the maximum steam pressure to which the pipe is designed to be subjected.

A further object is to provide a process by means of which the pipe closure may be quickly and cheaply made.

Other objects and advantages will appear in the following specification, and the novel features of the invention will be particularly pointed out in the appended claims.

My invention is illustrated in the accompanying drawings, forming part of this application, in which Figure 1 shows a portion of a pipe and an end plug, the pipe being shown partly in section, Figure 2 is a section through a portion of the pipe and end plug, showing the first step of the process, Figure 3 is a similar view showing the second step, Figure 4 is a sectional view showing the last step and the finished product, Figure 5 is a reduced section along the line 5—5 of Figure 4, and Figure 6 is a section through a modified form.

In carrying out my invention, I make use of a pipe 1 of material suitable for high pressure steam boilers and of any desirable shape, such as that shown in Figure 5 at 1 or that shown in Figure 6 at 1ª. The end of the pipe 1 is cut off square.

At 2 I have shown an end plug which is adapted to enter the open end of the pipe. This plug is provided with a circumferential groove 3 and has a flange 4 on one side of the groove, this flange having a curved portion 5 which meets the inner face 6 of the flange, thus forming a thin edge 7.

The first step in the process of forming a closure is to heat the end of the pipe 1 to a red heat and then by the use of a suitable flanging device to force the end portion 1ˣ into the groove 3 of the closure plug, as shown in Figure 2.

The end of the pipe with the attached plug 2 is again heated and the flange 4 is bent over against the outer portion of the pipe 1, as shown in Figure 3. During this bending step, a welding flux 8 is placed between the flange 4 and the pipe.

The pipe and the attached plug are now brought to a welding heat in a suitable forge or furnace and the flange 4 is welded to the end of the pipe by any suitable means and the weld finished in the form shown in Figure 4.

It will be seen that the pipe and the closure plug are virtually made one integral piece by this process, and that in addition to the integral portion that part of the pipe in the groove serves as an auxiliary pressure resisting means, although it is not welded at the bottom of the groove to the plug, and the closure thus formed will stand the most severe tests. The process can be quickly carried out at a relatively low cost.

I claim:

1. The herein described process of forming closures for pipes, which consists in placing in one end of the pipe a closure plug having a circumferential groove and an outwardly extending flange having a curved portion, bending the end of the pipe into the groove, bending the flange over the bent pipe end, and welding the bent flange to the bent pipe end.

2. The herein described process of forming closures for pipes, which consists in placing in a heated pipe end a closure plug having a circumferential groove and an outwardly extending flange having a curved portion, bending the heated end of the pipe into the groove to grip the plug, heating the pipe and the plug, bending the flange of the plug over the pipe end and reheating the pipe end and plug to a welding heat, and welding the bent flange to the bent pipe end.

3. The herein described process of forming closures for pipes, which consists in placing in a heated pipe end a closure plug having a circumferential groove and an outwardly extending flange having a curved portion, bending the heated end of the pipe into the groove to grip the plug, heating the pipe and the plug, placing a welding flux between the flange and the heated pipe end, bending the flange of the plug over the pipe end and reheating the pipe end and plug to a welding heat, and welding the bent flange to the bent pipe end.

PERCY JACKSON.